United States Patent [19]
Ogura et al.

[11] 3,906,261
[45] Sept. 16, 1975

[54] LINEAR ACCELERATION APPARATUS WITH COOLING SYSTEM

[75] Inventors: Shinzou Ogura; Masatami Iwamoto; Mitsuru Fukushima; Kazuharu Oshio; Tadashi Majima; Toshiyuki Kaneda; Hideo Nishii, all of Amagasaki, Japan

[73] Assignee: Mitsubishi Denki Kabushiki Kaisha, Amagasaki, Japan

[22] Filed: June 10, 1974

[21] Appl. No.: 478,161

[30] Foreign Application Priority Data
June 12, 1973  Japan............... 48-66194
June 14, 1973  Japan............... 48-67150
Dec. 3, 1973   Japan............... 48-135889
Feb. 18, 1974  Japan............... 49-19206

[52] U.S. Cl. .............. 310/12; 310/13; 310/54; 165/105; 62/505; 417/50
[51] Int. Cl.² ..................... H02K 41/02
[58] Field of Search ............ 310/12–14, 310/16, 11, 54–65; 417/50; 62/505; 165/105

[56] References Cited
UNITED STATES PATENTS

| | | | |
|---|---|---|---|
| 1,761,387 | 6/1930 | Gay.................. | 310/54 X |
| 3,150,277 | 9/1964 | Chubb et al......... | 310/54 |
| 3,453,460 | 7/1969 | Butler et al........ | 310/11 |
| 3,609,991 | 10/1971 | Chu et al.......... | 165/105 X |
| 3,668,444 | 6/1972 | Davey............... | 310/13 |
| 3,738,777 | 6/1973 | Von Starck......... | 417/50 |
| 3,749,962 | 7/1973 | Smith et al........ | 165/105 X |
| 3,789,249 | 1/1974 | Purman.............. | 310/54 |
| 3,852,627 | 12/1974 | Davis.............. | 310/13 |

*Primary Examiner*—Donovan F. Duggan
*Attorney, Agent, or Firm*—Wenderoth, Lind & Ponack

[57] ABSTRACT

A stator winding on an acceleration tube is immersed in a vaporizable cooling liquid and cooled through the generation of a vapor from the cooling medium due to heating of the winding. The vapor enters a condenser chamber disposed above the winding to be condensed. The condensate falls on the cooling liquid. To bring the cooling liquid into direct contact with a magnet wire for the winding and to permit the vapor to flow past the wire, the winding can be provided with radial and/or axial passageways for the cooling liquid. Further a cooling coil and partitions can be disposed above the winding in a container to provide a serpentine passageway for the vapor.

9 Claims, 22 Drawing Figures

LINEAR ACCELERATION APPARATUS WITH COOLING SYSTEM

BACKGROUND OF THE INVENTION

This invention relates to a linear motor type acceleration apparatus for use in employing the ebullition cooling systems of cooling electrically generated heat through the ebullition of a cooling medium involved.

There has already been known an electrical acceleration apparatus of the type wherein the accelerated body formed of a ferromagnetic material or a combination of a ferromagnetic material and an electrically conductive material is accelerated by means of the moving magnetic field established through the excitation of the associated stator. such an acceleration apparatus is used in the operation of accelerating the carrier on shuttle-less looms. The cooling of linear electric-motor type shuttle-less looms has been previously accomplished by circulating the cooling fluid such as oil through the container having the associated winding disposed therein. The measure has been insufficient for a good cooling effect and causes the winding to have a large temperature rise and also results in the problem that the acceleration is effected at higher speeds and with high frequencies. Further it has been required to provide an oil reservoir, a circulating pump, a control therefor etc. resulting in the disadvantages that the apparatus as a whole became complicated and large-sized.

SUMMARY OF THE INVENTION

Accordingly it is a general object of the present invention to eliminate the disadvantages of and objections to the prior art practice as above described.

It is an object of the present invention to provide a new and improved linear electric-motor type acceleration apparatus including a stator winding immersed in a cooling medium in the form of a liquid to be cooled through the generation of a vapor upon boiling of the cooling medium due to the heating of the stator winding so as to produce a cooling effect which is excellent.

The present invention accomplishes these objects by the provision of a linear electric-motor type acceleration apparatus comprising, in combination, an amount of cooling medium in the form of a liquid capable of boiling to form a vapor, a coolant container accommodating the amount of cooling medium therein, a tubular means extending through the container, stator winding means wound around the tubular member and immersed in the cooling medium, the stator winding means being electrically excited to establish a moving magnetic field to accelerate an accelerated body within the tubular member, and condenser means operatively connected to the coolant container to liquidize the vapor from the cooling medium and to return the liquidized medium to the coolant container.

Preferably, the stator winding means may include a plurality of coil units disposed to form predetermined spacings therebetween, each of the coil units being wound in a single layer in a selected one of the radial and axial directions of the coil unit thereby to bring the cooling medium into direct contact with an electrically insulated wire forming the coil units and also to permit the vapor from the cooling medium to flow past the electrically insulated wire.

When the apparatus includes at least one component positioned to impede the vapor of the cooling medium generated on a heat dissipation surface of the stationary winding means from reaching the free surface of the cooling medium, the component may be advantageously provided with passageway means permitting a flow of the vapor to prevent the vapor from covering the heat dissipation surface of the stator winding means.

In order to render the apparatus small-sized and further increase the cooling effect, cooling pipe means forming the condenser means may disposed above the stator winding means within the container to condense the vapor of the cooling medium generated through the heat dissipation from the stator winding means, and partition means may be disposed above the cooling medium to provide passageway means for the vapor to maintain the vapor in good contact with the cooling pipe means.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

The present invention resides in a linear electric-motor type acceleration apparatus cooled by an ebullition cooling system and forming the primary of the linear motor for establishing a moving magnetic field operative to accelerate and eject a secondary body or aa moving body of electrically conductive material. Such an acceleration apparatus is used for accelerating and ejecting the carrier on shuttle-less looms.

Figure 1:
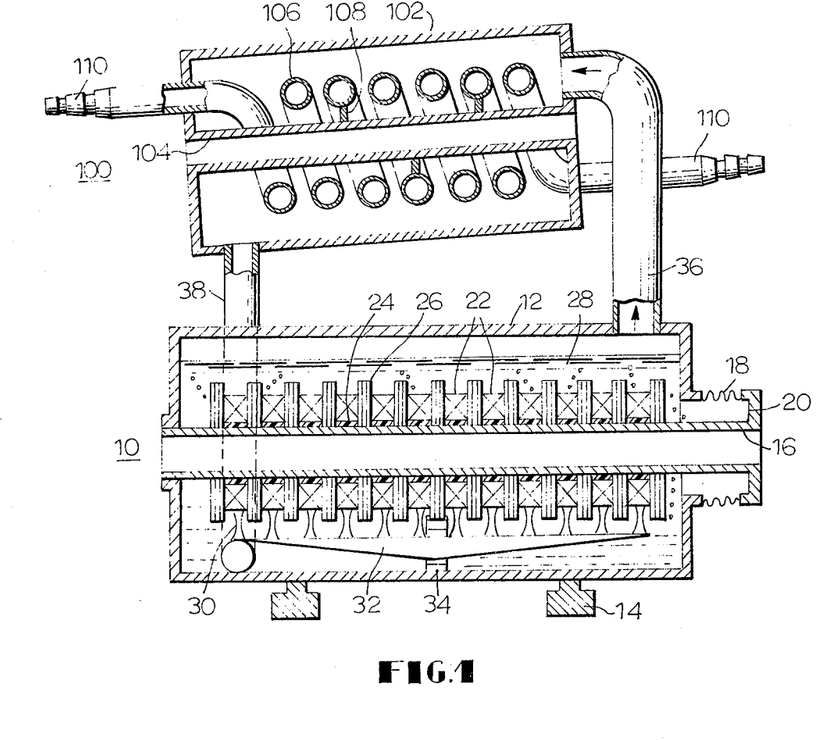
FIG. 1 is a longitudinal sectional view, partly in elevation, of an acceleration apparatus constructed in accordance with the principles of the present invention.

Referring now to the drawings and FIG. 1 in particular, there is illustrated a linear motor type acceleration apparatus constructed in accordance with the principles of the present invention. The arrangement illustrated comprises an acceleration unit generally designated by the reference numeral 10 and a condenser unit for a cooling medium generally designated by the reference numeral 100 and disposed above the acceleration unit 10. The acceleration unit 10 includes a coolant cylindrical container 12 supported by supporting members 14, and an acceleration tube 16 centrally extending through the container 12 and also through a bellows 18 projecting from one end of the container 12. The tube 16 is open at both ends and the bellows 18 has the free end closed with outwardly directed flange 20 disposed at the adjacent end of the tube 16 and serves to accommodate expansion and contraction developed between the container 12 and the flange 20. The other end of the tube 16 is sealed to the side wall of the container 12.

Within the container 12, an electromagnetic winding 22 forming a stator winding is disposed around the central tube 16 through an electrically insulating layer 24 with one apertured spacer 26 of electrically insulating material interposed between each pair of adjacent winding sections. Another insulating spacer 26 also abuts against each end of the winding 22 disposed around the tube 16. A cooling medium 28 is provided within the container 12 in an amount sufficient to immerse the winding 22 with the insulating spacer 26 therein but leaving a space above the surface thereof. The cooling medium 28 has a low boiling point and normally is in the form of a liquid. The cooling medium 28 may be preferably Freon (trademark) R-113.

Each winding section has a pair of leads 30 leading to the lower side thereof as viewed in FIG. 1 and all the leads 30 are collected into a bundle 32 of triangular cross section subsequently carried on a supporting member 34 disposed at the bottom of the container 12. The supporting member 34 serves to prevent the acceleration tube 18 from bending.

Figure 2:
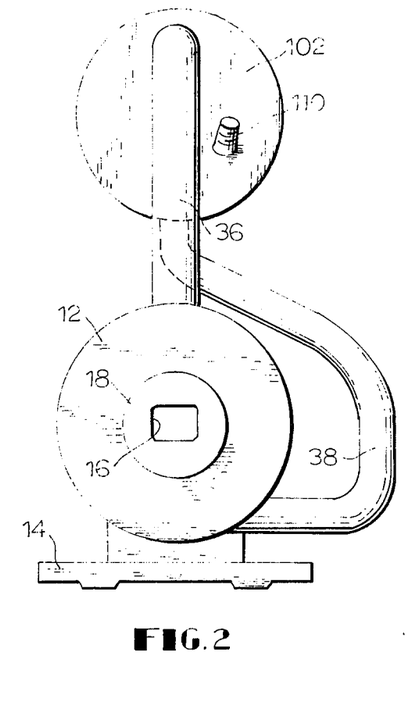
FIG. 2 is an end elevational view of the arrangement shown in FIG. 1.

The container 12 has a vapor conduit 36 extending from the upper wall portion thereof to the condenser unit 100 on one lateral wall and a liquid conduit 38 extending from the lower wall portion thereof to the condenser unit 100 on the lowermost wall portion as best shown in FIG. 2.

The condenser unit 100 includes a cylindrical container 102 closed at both ends, a hollow tubular member 104 extending along the central axis of the container 102 throughout the length and open at both ends, and a cooling pipe 106 helically wound around the central tubular member 104 through supporting pieces 108 interposed therebetween. The coiled pipe 106 has one end portion 110 extended and sealed through that end wall of the container 102 at which the vapor conduit 36 is opened and the other end portion 108 extended and sealed through the opposite end wall of the container 102. Both end portions of the pipe 106 form an inlet and an outlet. The interior of the container 102 is constructed such that it can be maintained under a vacuum in order that a cooling medium involved is easily boiled in the coolant container 12.

As an example, an acceleration apparatus for accelerating and ejecting a carrier in a shuttle-less loom was constructed as shown in FIG. 1. The apparatus included the acceleration unit 10 having an overall length of about 1000 mm and an outside diameter of about 80 mm, and the central acceleration tube 16 formed into a rectangular tube having a lateral dimension of about 13 mm and a height of about 10 mm of a stainless steel sheet 0.35 mm thick. Also the insulating spacers 26 were formed of a Bakelite (trade mark) sheet having a thickness of about 0.5 mm.

In operation the stator winding 22 generates heat due to a flow of an electric current therethrough. The heat thus generated is effective for boiling the cooling medium 28 within the container 12 to form a vapor. Upon this boiling or ebullition, the cooling medium 28 takes up from the winding 22 heat equal to the heat of vaporization to cool the winding 22. The vapor from the cooling medium 28 enters the container 102 of the condenser unit 100 through the vapor conduit 36 shown by the arrows in FIG. 1.

On the other hand, the cooling pipe 106 within the condenser's container 102 has a coolant such as water circulating therethrough. The vapor from the cooling medium 28 entering the container 102 contacts the cooling pipe 106 to be liquidized. Then the liquidized cooling medium 28 is returned to the container 12 through the liquid conduit 38.

It has been found that the arrangement as shown in FIGS. 1 and 2 is distinctively superior in its cooling effect to a conventional forced-oil cooled acceleration apparatus. This can be attributed to the fact that during the ebullition the vapor resulting from the boiled cooling medium rises perpendicularly to the longitudinal axis of the container 12 along which the sections of the winding 22 are rectilinearly disposed whereby the lead bundle 32 is prevented from impeding the cooling effect exhibited by the ebullition cooling means as above described.

Figure 3:
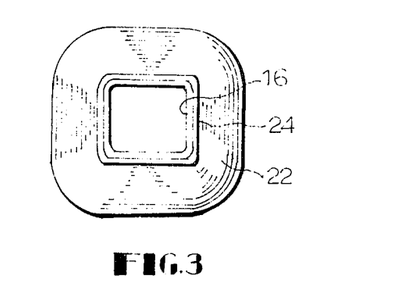
FIG. 3 is a cross sectional view of the stator winding shown in FIG. 1.

As shown in FIG. 1, each section of the winding 22 is maintained spaced from the adjacent winding sections by appropriate gaps as determined by the insulating spacers 26 interposed therebetween. This permits the end faces of each winding section to be effectively cooled with a stream of the cooling medium originating from a difference in vapor pressure. Thus it is possible to dispose the winding 22 around the acceleration tube 16 through the thin insulating layer 24 interposed therebetween without any gap therebetween as best shown in FIG. 3. That is, the winding 22 can be disposed in the close vicinity of the acceleration tube 16 thereby to decrease the distance between the winding 22 and an accelerated body (not shown) adapted to be moved through the acceleration tube. This decrease in distance causes an increase in the acceleration of the accelerated body for each unit of consumption of electric power resulting in the ejection of the accelerated body at higher speeds.

It will readily be appreciated that in conventional oil cooling systems, the supporting member 34 has been difficult to position in the container 12 because of its resistance to a stream of oil. In the arrangement shown in FIGS. 1 and 2, however, the supporting member 34 does not effect the cooling effect provided through the ebullition of the cooling medium and therefore it is possible to facilitate the mounting of the supporting member 34 within the container 12. This results in an acceleration apparatus having a good ability for withstanding mechanical shocks such as vibrations.

Further in the arrangement of the present invention as shown in FIGS. 1 through 3, it is not necessary to operatively couple thereto an oil reservoir and an oil pump such as are required for oil cooling systems. Therefore the floor area required for installing the entire arrangement is much decreased as compared with conventional oil cooling systems. In addition, as the condenser unit 100 is only disposed above the acceleration unit 10, the required floor area need only be sufficient for the acceleration unit while a unitary structure in which both units are connected together facilitates the installation thereof.

Since the arrangement includes no oil pump, moving parts are omitted and noise resulting from the operation of the oil pump is not generated. The only noise is from the sliding movement of an accelerated body involved along the acceleration tube. Thus an acceleration apparatus quite free from noise is produced, which is of great value in view of the low noise looms presently demanded. Furthermore the ebullition cooled acceleration apparatus eliminates the necessity of employing an auxiliary source of electric power for driving the associated oil pump required for oil cooling systems.

Although the winding 22 may be embedded in with any suitable resinous material, the embedding of the winding is not required. With the cooling medium being Freon (tradmark) that has as high a dielectric characteristic as insulating oils, the winding may be a wire including a Freon resisting coating. Then the winding as wound can be immersed in the Freon. This results in the advantage that the winding is directly cooled through boiling of the Freon.

Figure 4:
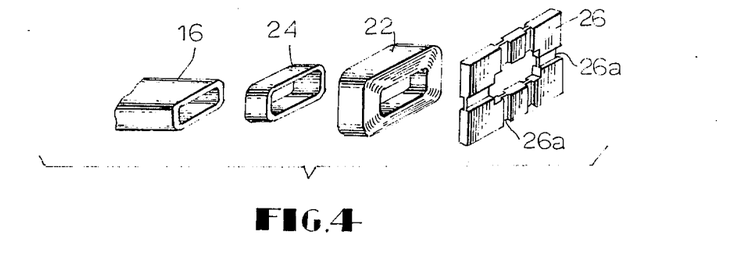
FIG. 4 is an exploded perspective view of one portion of the stator winding shown in FIGS. 1 and 3.

FIG. 4 shows one manner in which a magnet wire is wound into a section of a winding. The magnet wire used is a copper wire coated with a thin film of electrically insulating material resistant to the cooling medium involved, in this case, Freon and coolable through the ebullition of the Freon. The insulating spacer 26 is formed of any suitable electrically insulating material and includes a central aperture complementary in cross section to the acceleration tube 16 and also longitudinal and transverse grooves 26a on both faces thereof extending from the central aperture to the associated edges thereof. If desired, the grooves 26a may be omitted. Then any desired number of the insulating spacers 26 are fitted at predetermined equal intervals onto the acceleration tube 16 and fixed thereto by means of an adhesive. An electrically insulating tape 24 having a width substantially equal to the spacing between the spacers is convolutely wound around the tube 16 in each of the spacings to form coil bobbins with the adjacent apacers and the adjacent portions of the tube 16. Then a magnet wire as above described is successively wound in multiple layers on the bobbins thus formed to successively form winding sections. The winding 22 is completed by interconnecting the winding sections as required. The Freon in the form of a liquid can penetrate even into the interior of the winding 22 leading to great improvements in the cooling effect. Also the winding faces are cooled with a spontaneous stream of the cooling medium caused from a difference in pressure of the vaporized medium. The cooling effect is further enhanced by the grooves 26a in the insulating spacers 26 permitting the cooling medium to flow past the end faces of the adjacent winding sections.

Figure 6:
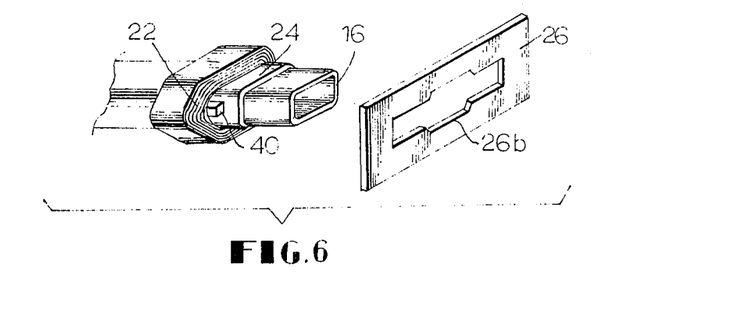
FIG. 6 is an exploded perspective view of one portion of the stator winding shown in FIG. 5.

The thinner the insulating spacer 26 the higher the space factor of the winding 22 and therefore the higher the efficiency of acceleration will be. If the spacer 26 is made thinner then the grooves 26a as shown in FIG. 4 can not be formed on the spacer 26. In the latter event, the central rectangular aperture on the spacer 26 can be provided at the opposite longer edges with a pair of opposite notches 26b as best shown in FIG. 6. The notches 26b are effective for aiding in cooling the end faces of the winding 22 sections.

Figure 5:
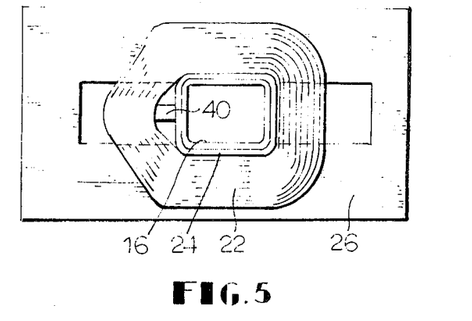
FIG. 5 is a cross sectional view of a modification of the stator winding shown in FIGS. 1, 3 and 4.

FIGS. 5 and 6 also illustrate another means for further enhancing the cooling effect. Coil bobbins are formed around the acceleration tube 16 in the same manner as above described in conjunction with FIGS. 3 and 4. Then a short prop 40 of any suitable, electrically insulating material is positioned on one side, in the example illustrated, the shorter side of the peripheral wall of each bobbin as shown in FIGS. 5 and 6. Following this, a magnet wire as above described is wound in multiple layers on each bobbin to form a winding section. As shown in FIGS. 5 and 6, the winding section has a gap locally formed between the same and the bobbin. The winding 22 is completed by interconnecting the winding sections thus formed as required. It will be appreciated that those gaps additionally aid in cooling the winding 22.

As above described, the winding 22 is formed around the acceleration tube 16 by directly winding a magnet wire around the latter and is therefore held in fixed relationship with the tube by means of a mechanical fastening force. This eliminates the necessity of providing a mechanism for fixedly securing the winding to the tube and also ensures that the acceleration imparted to an accelerated body or a carrier is infallibly prevented from reacting upon the winding.

From the foregoing it will be appreciated that, in the arrangements as above described, the vaporization of the cooling medium due to heat generated by the energized winding acts to cool the latter while the vaporized medium enters the condenser unit to be condensed after which the condensate is returned to the coolant container to again cool the winding. Thus the cooling effect is distinctively improved. Further the apparatus can be made small-sized as well as decreasing noise.

Figure 7:
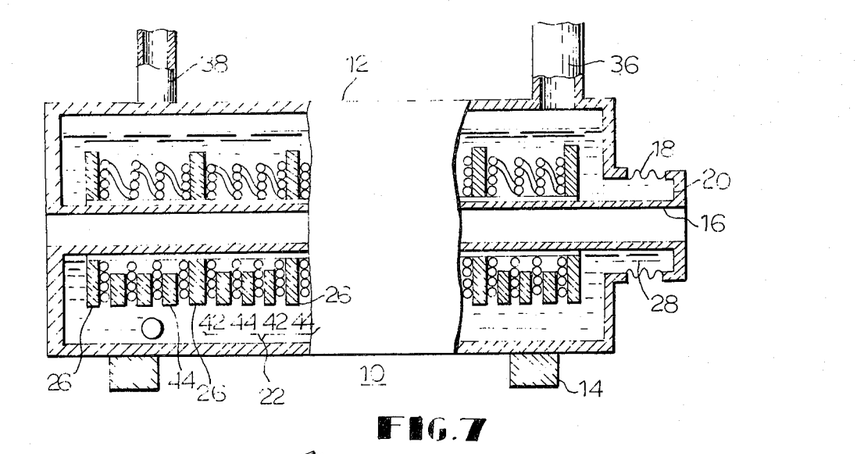
FIG. 7 is a fragmental longitudinal sectional view of a modification of the present invention.

Referring now to FIG. 7, there is illustrated a modification of the present invention. The arrangement illustrated is different from that shown in FIGS. 1 through 4 in the construction of the winding. As shown in FIG. 7, each section of the winding 22 includes a plurality of coil units, in this case, flat coils 42 serially interconnected in a series of bobbins similar to those shown in FIG. 1 excepting that the electrically insulating layer 26 is common to all the bobbins. The flat coils 42 are spaced from one another to form therebetween predetermined spacings through which the cooling medium 28 is permitted to flow.

In order to form one winding section on each bobbin, a removable temporary bobbin, (not shown) is detachably put on the bobbins and a magnetic wire such as above described having a diameter of 1 mm, for example, is convolutely wound along the temporary bobbin to form one flat coil 42 having a predetermined number of convolutions. Then the temporary bobbin is removed from the bobbin while at the same time a plurality, in this case four, of small cleats 44 about 1 mm thick are disposed on one face of the flat coil 42 (see FIG. 9) to prevent the flat coil 44 from collapsing and also form a gap between the coil 44 thus formed and the next succeeding coil.

Figure 9:
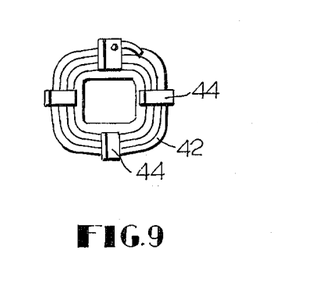

Thereafter the temporary bobbin is again disposed adjacent the small cleats 44 on the same bobbin and the magnet wire is convolutely wound along the temporary bobbin to form another flat coil 42 identical to the first flat coil 42, and spaced therefrom by the cleats 44.

Figure 8:
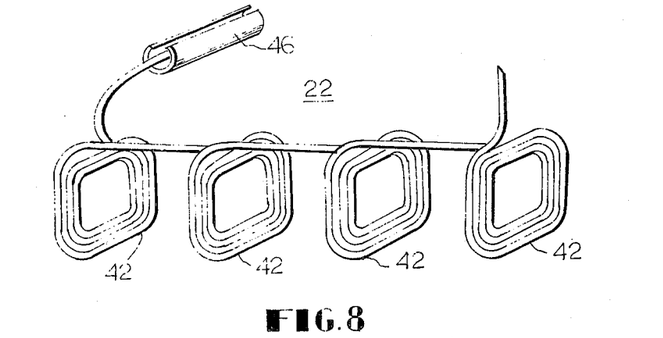
FIGS. 8 and 9 are views useful in explaining the construction of the stator winding shown in FIG. 7.

The process as above described is repeated to form the succeeding flat coils 42 until the winding section is completed. FIG. 8 shows in exploded view, the winding section 42 thus formed. The remaining sections of the winding 22 are formed in the same manner as above described. Thus the convolutions of the winding 22, that is, the magnet wire forming the flat coils 42 are maintained in direct contact with the cooling medium 28.

Figure 10:
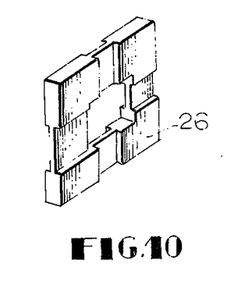
FIG. 10 is a perspective view of the insulating spacer for the stator winding shown in FIG. 7.

In order to uniformly cool the winding sections, each of the insulating spacers 26 preferably has a contact area with the convolutions of the adjacent flat coils 44 small enough to mechanically hold the winding sections as well as having grooves disposed thereon so that a vapor from the cooling medium generated in the lower grooves can upwardly escape to prevent the vapor from being accumulated and locked therein. FIG. 10 shows one preferable form of such an insulating spacer 26 including horizontally aligned grooves and vertically aligned grooves.

Figure 11:
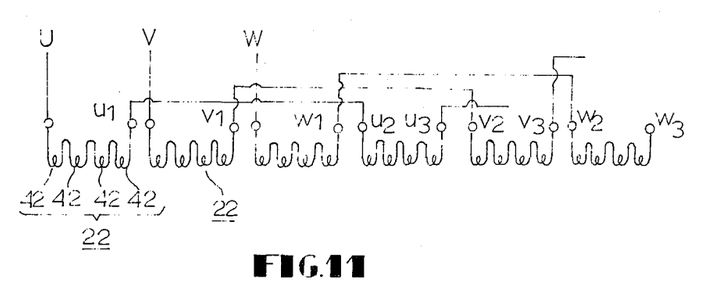
FIG. 11 is a wiring diagram of the stator winding shown in FIG. 7.

The winding sections are interconnected as shown in FIG. 11 to establish a moving magnetic field. Assuming that the winding 22 is energized by a source of three-phase alternating current (not shown), the first winding section is serially connected to every third winding section to form a U-phase. A V phase is formed of the second winding section serially connected to every third winding section while a W phase is formed of the third winding section having the winding sections similarly connected. For example, each of the first, second and third windings is serially connected to the fourth, fifth and sixth winding section through respective coil terminals $u_1$ and $u_2$, $v_1$ and $v_2$ or $w_1$ and $w_2$ respectively. In the connection of the winding sections as shown in FIG. 11, a low potential is developed between the adjacent flat coils of each winding section but a high potential appears on one electrical conductor connecting each pair of adjacent winding sections. Therefore the conductors are required to be encircled with electrically insulating sleeves having a wall thickness larger than the thickness of the insulating layer on the magnet wire forming the coils. However the conductors are preferably cooled through the ebullition of the cooling medium to uniformly cool the system. To this end, each conductor is threaded into an electrically insulating sleeve 46 having formed on the upper portion a longitudinal gap providing a leakage path for a vapor generated therein, as shown in FIG. 8.

Figure 12:
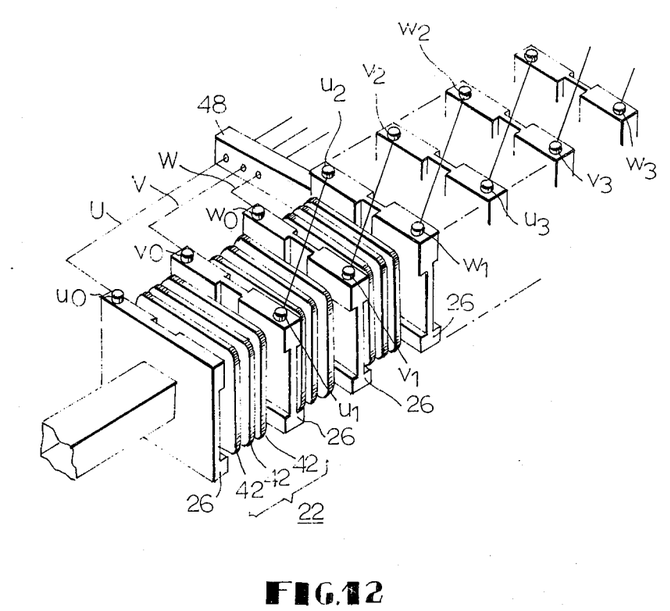
FIG. 12 is a fragmental perspective view of another modification of the present invention with parts outlined.

FIG. 12 shows an alternative of the manner in which the sections of the winding 22 are interconnected to form the U, V and W phases. The arrangement illustrated includes a pair of terminal blocks 48 attached to selected two of the insulating spacers 26. In FIG. 12, only one terminal block 48 is shown as being attached to the lefthand side of the fourth spacer 26. Three lengths of magnet wire identical to that forming the winding 22 are fixedly extended in spaced relationship through the terminal block 48 and connected to terminals $u_0$, $v_0$ and $w_0$ disposed on the first, second and third spacers 26. Then the same magnet wire is utilized to connect terminals $u_1$, $v_1$ and $w_1$ on the second, third and fourth spacers 26 to terminals $u_2$, $v_2$ and $w_2$ on the fourth, fifth and sixth spacers 26 respectively and so on. Thus the U, V and W phases are formed. Terminals $u_3$, $v_3$ and $w_3$ are connected to those on the associated ones of the succeeding winding sections.

In the arrangement of FIG. 12, conductors connected to the winding sections are firmly maintained in place while they are prevented from contacting one another.

Figure 13:
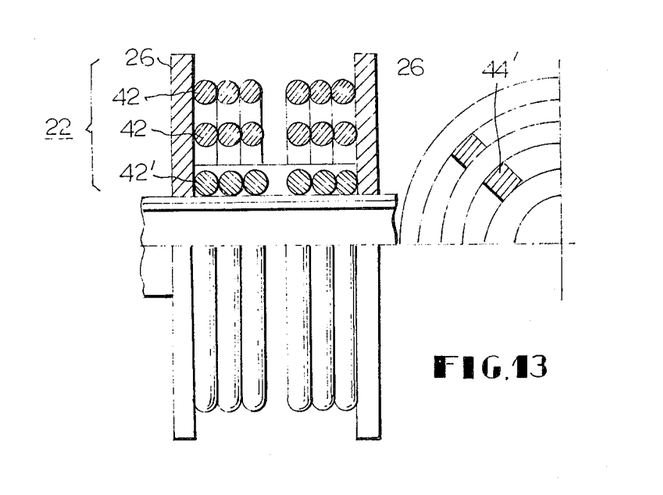
FIG. 13 is a fragmental longitudinal sectional view of the stator winding shown in FIG. 12 and fragmental side and end elevational views thereof.

FIG. 13 shows modification of one section of the winding 22. A magnet wire such as above described is helically wound on each bobbin such as shown in FIG. 7 to form a coil unit or a single layer coil 42' with a central gap formed therein equal for example to the diameter of the wire. Then a plurality of relatively thin spacers 44' are disposed in spaced relationship upon the coil 42' thus formed and the same magnetic wire is helically wound around the spacers 44' to form another single layer coil 42' having a central gap radially aligned with that formed in the underlying coil 42' and radially spaced away from the latter by a gap as determined by the spacer 44'. The process as above described is repeated to form the succeeding coils 42' until one winding section is completed having a predetermined number of coil layers. The remaining sections of the winding are formed in the same manner as above described.

In the arrangement of FIG. 13, it will be seen that one passageway for flow of a vapor from the cooling medium is formed between each pair of adjacent coils while a radial gap is formed at the central portion of each winding section. The vapor of the cooling medium generated in the passageway between the adjacent coils is permitted to escape through the radial gap in each section of the winding 22 to the exterior thereof. Thus the winding 22 is effectively and uniformly cooled through the ebullition of the cooling medium.

With a closed wound multiple-layer winding used in the ebullition cooling system the outer portion thereof can easily be cooled because the ebullition cooling is sufficiently accomplished thereon. At the beginning of the ebullition of the cooling medium the latter can be vaporized in the form of bubbles in minute clearances origianlly formed between the convolutions of the inner portion of the winding. However these bubbles can not escape to the exterior of the winding but are locked in such clearances. Under these circumstances, the cooling of the inner winding portion depends upon the conduction of heat caused from the contacting of the convolutions of the winding. Thus the inner winding portion is very pooly cooled resulting in uneven cooling.

In the constructions of the winding 22 as shown in FIGS. 7 through 10 and FIG. 12, each section of the winding 22 includes a plurality of radial gaps while in the construction of the winding 22 as shown in FIG. 13, each section of the winding 22 includes the central radial gap and a plurality of axial gaps opening into the radial gap. Thus the vapor generated in the inner winding portion can readily escape through those gaps to the exterior of the winding resulting in an increase in the cooling capability required for uniformly cooling the winding in its entirety.

Figure 14:
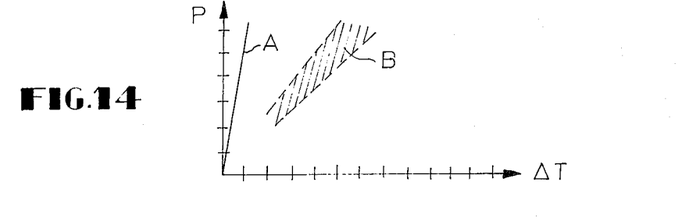
FIG. 14 is a graph illustrating the cooling effect exhibited by the arrangement shown in FIG. 12.

Experiments have been conducted with windings such as shown in FIGS. 7 through 10 and closed wound windings having an outside diameter of 20 mm, an inside diameter of 10 mm and a thickness of 15 mm. The results of the experiments are illustrated in FIG. 14 wherein the ordinate represents electric power P in kilowatts supplied to the winding and the abscissas represents the temperature of the winding. In the close wound windings, the temperature is represented by a differential temperature T in degrees Centigrade equal to the temperature on the central portion of the innermost layer of the winding minus the entry temperature of the cooling water involved. In the winding including the flatwise coils, the temperature illustrated in FIG. 14 is represented by a differential temperature T equal to the temperature on the first convolution of one flatwise coil 42 with which the coil starts to be wound on the bobbins.

In FIG. 14 the straight line labelled with the reference character A is for the windings including the flat coils and the hatched portion labelled with the reference character B is for the close wound windings. As clearly shown in FIG. 14, the windings including the flat coils could be supplied electric power equal to about five times the electric power capable of being supplied to the close wound windings.

From the foregoing it will be appreciated that the present invention and particularly the form thereof as shown in FIGS. 7 through 10, FIG. 12 or FIG. 13 can provide an acceleration apparatus for looms having a capability of high speed ejection of a carrier involved higher than that previously possible. Alternatively, the present apparatus can decrease the distance required for accelerating the carrier as compared with a conventional acceleration apparatus. In other words, it is possible to decrease the space occupied by looms except for the woven cloth manufactured by the latter.

Figure 15:
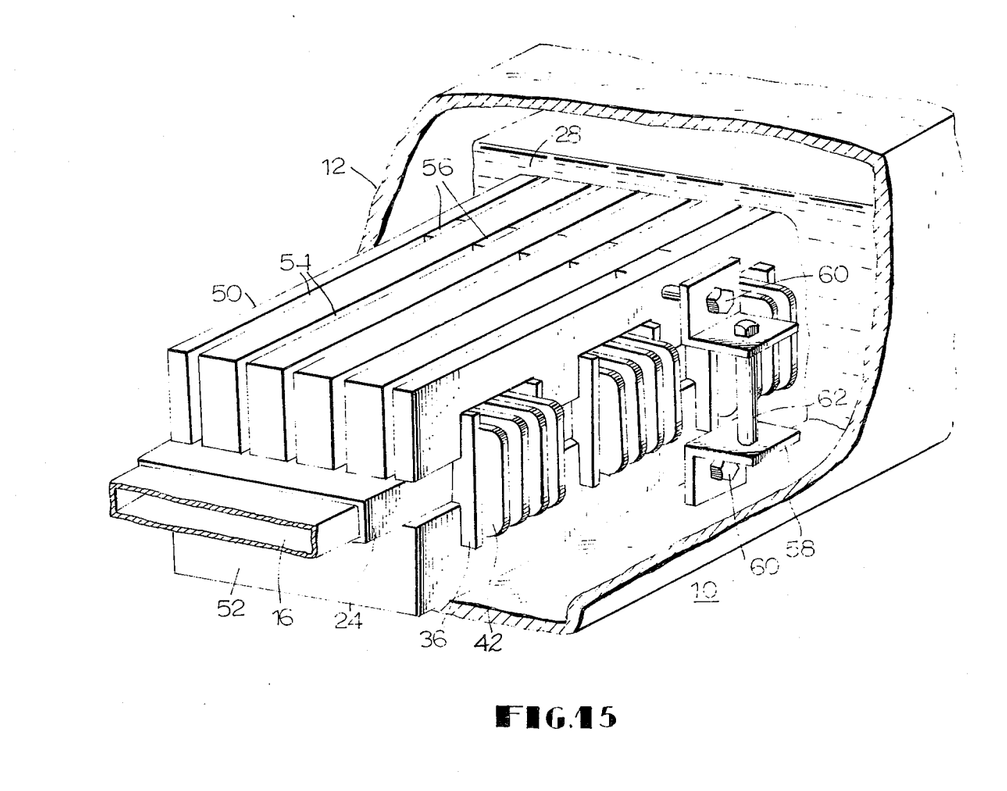
FIG. 15 is a fragmental perspective view of still another modification of the present invention with parts broken away to illustrate the internal construction.
Figure 16:
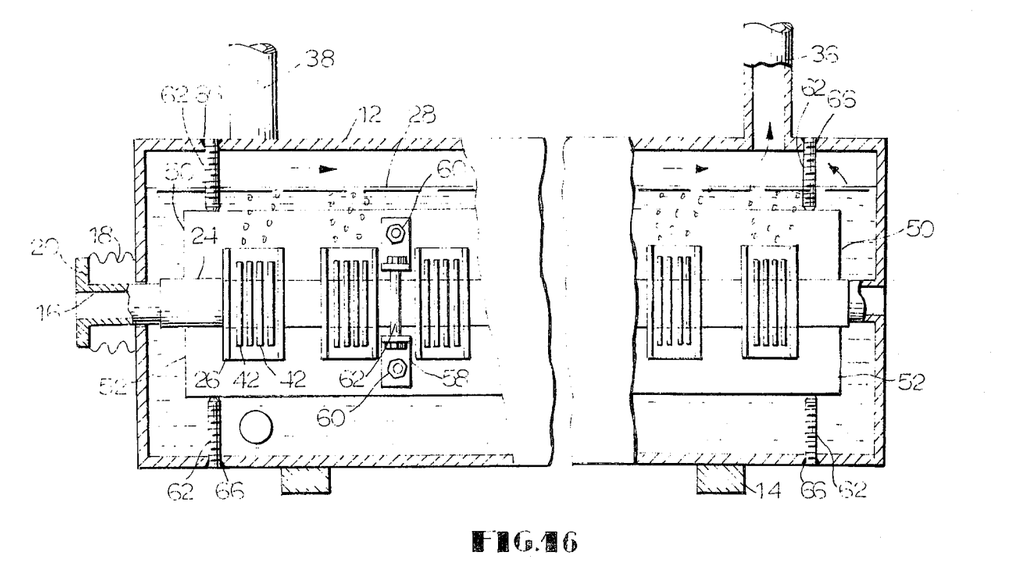
FIG. 16 is a longitudinal sectional view of the arrangement shown in FIG. 15 with parts omitted.
Figure 17:
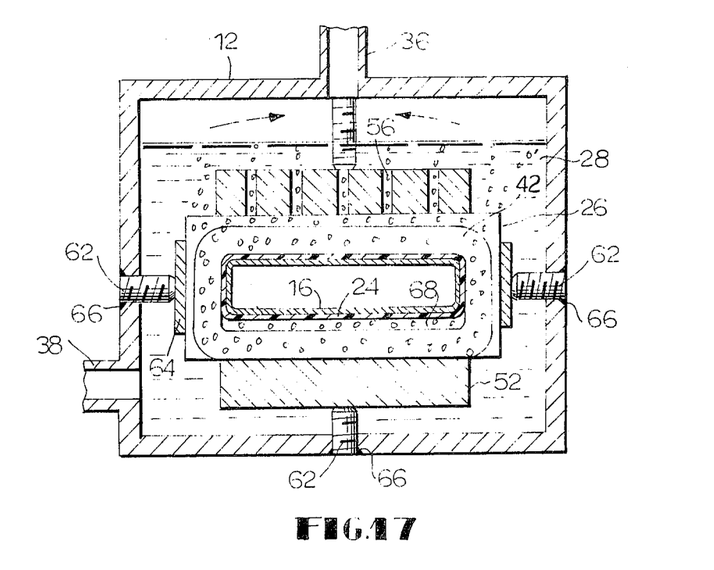
FIG. 17 is a cross sectional view of the arrangement shown in FIG. 15.

Referring now to FIGS. 15, 16 and 17, there is illustrated another modification of the present invention wherein the winding such as shown in FIG. 7 disposed around the acceleration tube is operatively coupled to a pair of upper and lower iron cores. As best shown in FIG. 15 wherein one portion of the acceleration unit 10 is illustrated in perspective view with parts broken away, a pair of opposite iron cores 50 and 52 are disposed on the upper and lower walls of the acceleration tube 12 through the electrically insulating layer 24 to carry the tube 16 therebetween. The lower iron core 52 is of a one piece structure while the upper iron core 50 includes a plurality of longitudinally elongated magnetic members of rectangular cross section disposed in spaced parallel relationship to leave therebetween slits 54 as determined by spacers 56 interposed between the adjacent magnetic members. A pair of fastening brackets 58 having an L-shaped section are attached to either of the bilateral sides of each iron core 50 or 52 by means of a bolt 60 extending through one leg of each "L" and screw threaded into the outermost magnetic member. Then another bolt 62 engages the other legs of the opposite "L's" to interconnect the brackets 58 thereby to connect and maintain the upper and lower iron cores 50 and 52, and tube 16 with the winding 22 in a unitary structure. Only for purposes of illustration, only one of fastening means 58, 60 and 62 is illustrated.

In the arrangement as shown in FIGS. 15 through 17, the acceleration tube 16 is preferably formed with a thin wall of any suitable non-magnetic material high in electric resistivity in order to minimize the iron loss of the arrangement due to a flow of eddy current through the material of the tube 16 while decreasing the reluctance thereof. Therefore the tube 16 has a low mechanical strength. But the tube 16 is sandwiched between the upper and lower iron cores 50 and 52 through the insulating spacers 26 and connected along with the iron cores into the unitary structure by the fastening means 58-60-62. In order to prevent the fastening force from being directly applied to the tube 16 which has the low mechanical strength, the insulating spacers 26 are so dimensioned as to directly bear the iron cores 50 and 52.

To maintain the assembly of the iron cores 50, and 52, and the tube 16 with the winding 22 in place within the coolant container 12, a plurality of pairs of set screws 62 are disposed in spaced, vertically opposite relationship on the upper and lower walls of the container 12 so as to extend into the interior thereof to cause the extremities of the screws to abut against the adjacent iron cores 50 and 52 as shown in FIG. 16 wherein there is illustrated a longitudinal sectional view of the arrangement shown in FIG. 15. In addition, other pairs of set screws 62 extend in spaced, horizontally opposite relationship through the container 12 until the extremities thereof abut against the lateral sides of the insulating spacers 26 through respective pads 66 as shown in FIG. 17 wherein there is illustrated a cross sectional view of the arrangement shown in FIG. 15. The set screws 62 are turned to maintain the linear motor precisely at its predetermined position within the container 12 after which the heads of the screws 62 are welded at 66 to the adjacent wall portions of the container 12 for the purpose as will be apparent hereinafter.

In FIG. 17 a gap 68 is shown as being formed between the outer lower wall surface of the tube 12 and strictly that portion of the insulating layer 26 disposed thereon and the adjacent portion of the innermost convolutions of the winding 42. Since the set screws 62 have the heads welded to the adjacent portions of the walls of the container 12, those portions of the set screws 62 screw threaded into the adjacent wall portions of the container 12 are hermetically closed ensuring that the cooling medium 28 charged in the container 12 is prevented from leaking through around the set screws to the atmosphere.

The vapor from the cooling medium becomes in the form of bubbles tending to rise through the cooling medium by virtue of their own buoyancy. if any structural component is disposed in the course of rise of the bubbles to impede the rising movement of the bubbles then a vapor pool will be formed under the component until a portion of the winding 42 may be covered with the vapor pool. Since the vapor pool is low in thermal conductivity, that portion of the winding 42 covered with the vapor pool is permitted only to dissipate heat therefrom through the conduction of heat of the magnetic wire itself forming the winding. Eventually the winding may be locally burnt away.

In the arrangement as shown in FIGS. 15 through 17, the upper iron core 50 tending to impede the rising movement of the bubbles is provided with a plurality of longitudinal slits 54 permitting the vapor bubbles generated within and around the winding 42 to flow to the free surface of the cooling medium 28 therethrough. The upper iron core 50 is advantageously formed of a stack of steel laminations and has the spacers 56 suitably inserted into the stack to form the slits 54.

Also as heat is generated principally in the windings 42, the two iron cores are not particularly required to be cooled. Thus the lower iron core 52 overlaid by the winding 42 need include slits such as the slits 56. If desired, the lower iron core 52 may include such slits serving to aid in causing flows of the vapor bubbles.

On the other hand, vapor bubbles generated on the lower side of the winding 42 can be moved along the outer lower side of the tube 16 in the righthand or lefthand direction as viewed in FIG. 16 until the bubbles are upwardly moved from one or the other end of the tube 16. However a vapor pool or pools will be formed on the underside of the tube 16. The gap 68 disposed on the underside of the tube 16 is to prevent the vapor pool or pools thus formed from covering the adjacent portion or portions of the winding 42 while providing a passageway for the vapor bubbles.

Figure 18:
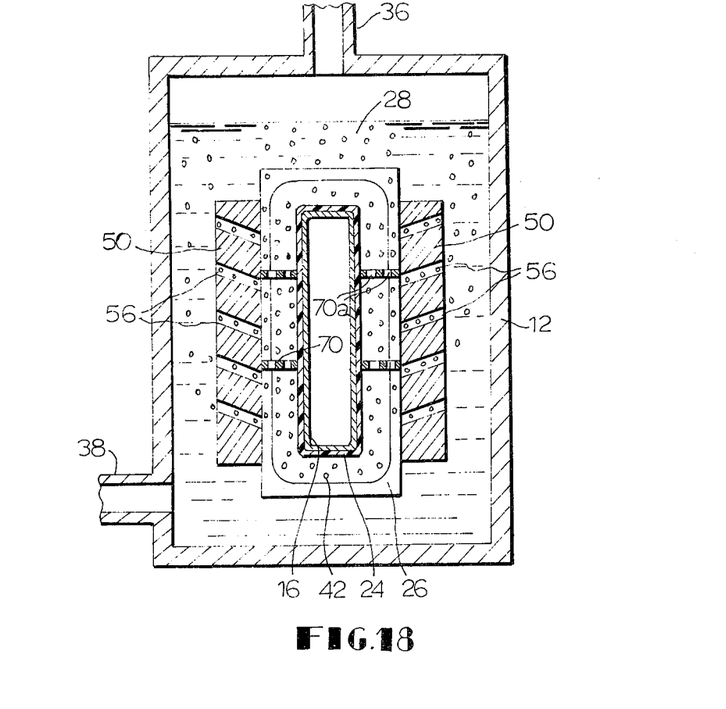
FIG. 18 is a fragmental cross sectional view of a different modification of the present invention.

FIG. 18 shows a modification of the arrangement as shown in FIGS. 15 through 17. The arrangement illustrated comprises the acceleration tube 16 having a cross section in the form of a vertically elongated rectangle, a pair of bilateral iron cores 50 and 52 disposed in horizontally opposite relationship to carry the assembly of tube 16 and winding 42 therebetween. The winding 42 includes a plurality of electrically insulating spacers 70 disposed in spaced parallel relationship and perpendicularly to the spacers 26 and each provided with a plurality of through apertures 70a. Each of the iron cores 50 or 52 includes a plurality of slits 54 disposed in spaced parallel relationships and running outwardly and upwardly. In other respects, the arrangement is substantially similar to that shown in FIGS. 15 through 17.

Vapor bubbles caused from the cooling medium 28 are upwardly moved due to their own buoyancy so that one portion thereof passes through the apertures 70a in the spacers 70 and then rises to the surface of the cooling medium 28 while the remaining portion thereof passes through the slits 54 in the iron cores 50 and 52 and then rises to the surface of the cooling medium 28. Therefore, in the arrangment of FIG. 18 it is ensured that no vapor is formed on the underside of the spacers 70 whereby the winding 42 is prevented from being locally burnt away.

From the foregoing description made in conjunction with FIGS. 15 through 17 and FIG. 18 it will be appreciated that any structural component positioned to impede the rising movement of the vapor bubbles due to their own buoyancy is provided with passageways for vapor bubbles to prevent the winding from being locally overheated. Alternatively, the area of heat dissipation of the winding is prevented from decreasing. Thus the cooling effect is substantially increased.

Figure 19:
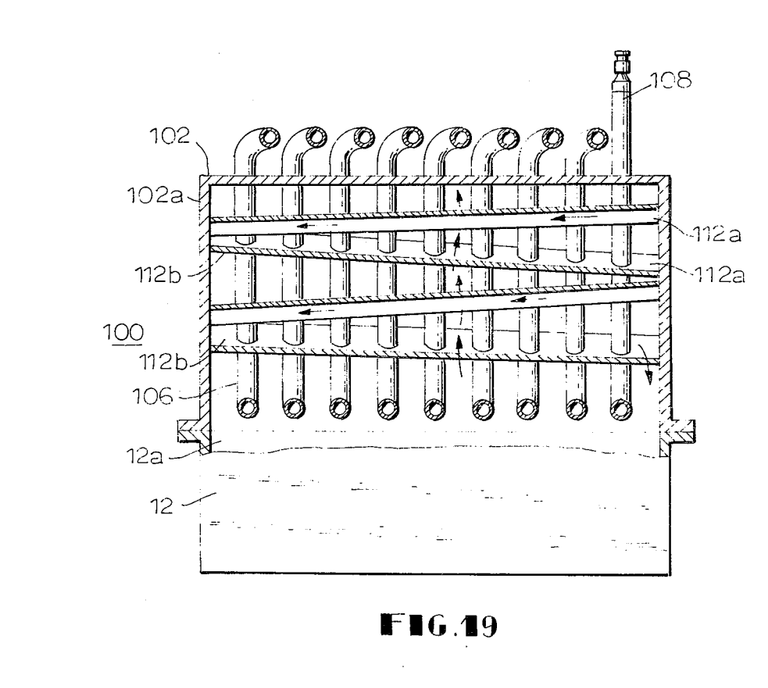
FIG. 19 is a fragmental sectional view of another modification of the present invention.
Figure 20:
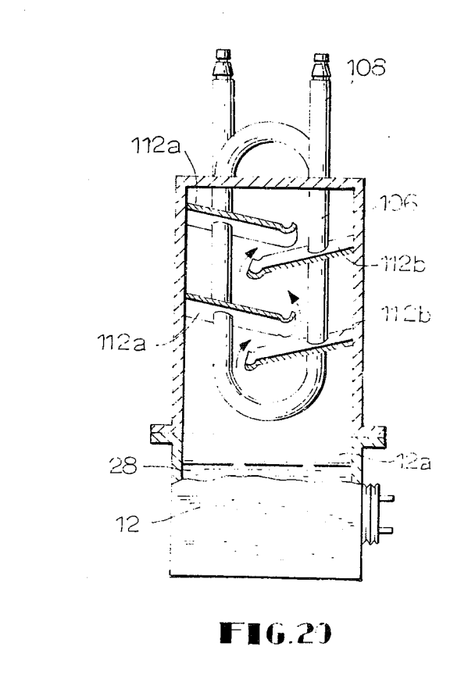
FIG. 20 is a fragmental side elevational sectional view of the arrangement shown in FIG. 18.

Referring now to FIGS. 19 and 20, there is illustrated a modification of the condenser unit shown in FIG. 1. The arrangement illustrated comprises a single container 12 having a coolant chamber 12A disposed in the lower portion thereof and a condenser chamber 102A disposed in the upper portion of the container 12. Although not illustrated, any of the acceleration units as above described can be installed in the coolant chamber 12A. As best shown in FIG. 20, a cooling pipe 106 is extended and sealed through one end portion of the upper wall of the container 12 to leave an inlet 108 above that wall while it vertially downwardly extends through the condenser chamber 102A until it reaches adjacent a boundary between the condenser and coolant chambers 102A and 12A respectively. Adjacent the boundary the cooling pipe 106 is upwardly turned into a U-shape and then vertically upwardly extends through the condenser chamber 102A to reach the upper wall of the condenser container 102A. After having been extended and sealed through the upper wall, the cooling pipe 106 appears on the exterior of the container 12 and is again turned into a U-shape to extend in the vertically downward direction. After having been extended and sealed through the upper wall of the container 12 on that portion adjacent the inlet 108 but slightly remote from the one end of the container 12, the cooling pipe 106 vertically downwardly extends through the condenser chamber 102A. Then the pipe 106 repeats the course as above described to advance lengthwise and toward the other end of the container 12 while forming a coil extending lengthwise of the container 12 and including convolutions partly disposed in the latter (see FIG. 19). The other end portion of the cooling tube 106 is extended and sealed through the other end portion of the upper wall of the container 12 to form an outlet above that wall.

Within the condenser chamber 102A, a pair of first and second arrays of partitions 112a and 112b are disposed in opposite relationship and tilted lengthwise of the latter and downwardly tilted toward the center of the width of the condenser chamber 102A. In FIG. 19, a pair of partitions 112a of the first array are shown as being downward inclined from one to the other end of the chamber 102A along the length thereof and a pair of partitions 112b of the second array are shown as being upwardly inclined from the one to the other end thereof. As best shown in FIG. 20, the partitions 112a of the first array portions alternate in vertically overlapped relaationship the partitions 112b of the second array. Also the free ends of all the partitions 112a and 112b are in the form of troughs. As best shown in FIG. 20, the succeeding convolutions of the cooling coil 106 have, for example, the downwardly extending portions extended and sealed through the partition 112b and the upwardly extending portions extended and sealed through the partition 112a, whereby the cooling coil or pipes are firmly maintained fixed within the container 12.

Heat generated by the acceleration unit (not shown) within the coolant chamber 12A increases the temperature of the cooling medium 28 to vaporize the latter. The vapor from the cooling medium 28 directly flows into the condenser chamber 102A from the free surface of the medium to be upwardly moved along passageways defined by the two arrays of partitions 112a and 112b as shown by the arrows in FIGS. 19 and 20. During this rising movement, the vapor is contacted by both the coiled cooling pipe 106 having flowing therethrough a coolant such as water and the partitions 112a and 12b so as to be converted to a condensate or the original cooling medium. At that time, the vapor imparts its latent heat to the cooling pipe and partitions to increase their temperatures. As shown by the arrows in FIG. 19, the condensate formed on each tilted partition of one of the first and second arrays falls upon that tilted partition of the other array located directly under the partition of the one array, through the trough on the latter. In this way the condensate falls upon the lowermost partition and then is returned to the coolant chamber 12A. The process as above described is repeated to cool the associated acceleration unit (not shown).

Figure 21:
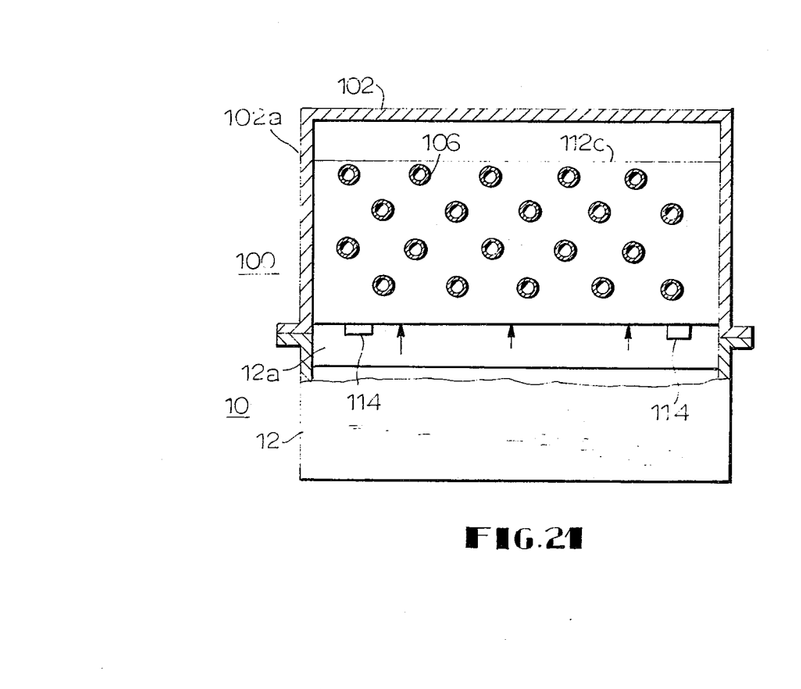
FIGS. 21 and 22 are views similar to FIGS. 18 and 19 respectively but illustrating another modification of the present invention.
Figure 22:
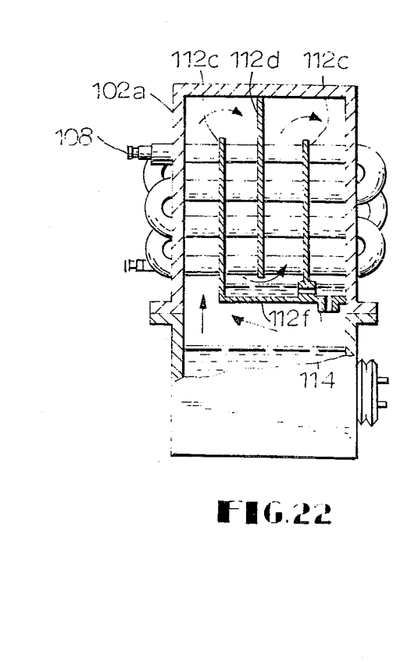

FIGS. 21 and 22 show a modification of the arrangement as illustrated in FIGS. 19 and 20. In the arrangement illustrated, the cooling pipe 106 substantially horizontally extends widthwise of the container 12 to describe a serpentine path in the direction of height of the condenser chamber 102 with the turning portions thereof disposed externally on both lateral sides of the chamber 102.

On the other hand, a plurality, in the example illustrated three, of the vertical partitions 112c, 112d and 112e are disposed in spaced parallel relationship across the width of the condenser chamber 102A to longitudinally compartment the interior of the chamber 102A into ascending and descending passageways. A bottom plate 112f is disposed below the vertical partitions 112c, 112d and 112e to define the lower ends of the passageways and includes a slit or a passageway 114 through which the cooling medium in the form of a liquid passes to the coolant chamber 12A as best shown in FIG. 22. The serpentine cooling pipe 106 has the substantially horizontal portions extended and sealed through the vertical partitions 112c, 112d and 112e.

The vapor from the coolant chamber 12A first ascends through the ascending passageway defined by the lefthand wall as viewed in FIG. 22 of the condenser chamber 102A and the vertical partition 112c and then descends through the descending passageway formed between the partitions 112c and 112d until it passes under the lower end of the partition 112d. Thereafter the vapor again ascends through the ascending passageway defined by the partitions 112d and 112e and then descends through the descending passageway formed between the partition 112e and the righthand wall as viewed in FIG. 22 of the condenser chamber 102A. In this way the vapor repeatedly and alternately ascends and descends through the condenser chamber 102A to be effectively cooled by the cooling pipe 106, until it is condensed.

The condensate formed during the movement of the vapor as above described is collected upon the bottom plate 112f and then returned to the coolant chamber 12A through the slit 114.

In the arrangement as shown in FIGS. 1 through 4 it has been found that an increase in cooling capability and therefore in the quantity of vapor generated through the ebullition of the cooling medium has led to an increase in resistance to a stream of vapor flowing through the vapor conduit 36 to such an extent that an increase in the inside diameter of the conduit is unable to compensate for the increase in that resistance. This has resulted in a decrease in the cooling effect. The arrangements as shown in FIGS. 19 and 20 and FIGS. 21 and 22 eliminate the disadvantage as above described and give the following results:

1. The interior of a single container is divided into the condenser chamber and coolant chamber to permit the vapor from the cooling medium to be directly moved into the condenser chamber. Therefore a passageway through which the vapor from the cooling medium flows into the condenser chamber is reduced in length. This presents a very low resistance to the stream of vapor. Also if the coolant chamber is elongated, the cooling effect remains unchanged.

2. The apparatus is simple and compact in construction because the liquid and vapor conduits are not required to be disposed between the coolant and condenser chambers, and 3. The apparatus well withstands mechanical shocks because of the elimination of the necessity of disposing the condenser in a container different from the coolant container.

While the present invention has been illustrated and described in conjunction with several preferred embodiments thereof it is to be understood that numerous changes and modifications may be resorted to without departing from the spirit and scope of the present invention.

What is claimed is:

1. A linear electric-motor type acceleration apparatus having a cooling system, comprising a tubular member, a stator winding means wound around a tubular member and capable of being electrically excited to establish a moving magnetic field to accelerate a body within the tubular member, a coolant container means, a body of liquid cooling medium capable of boiling to form a vapor accommodated in said coolant container means, said stator winding means and said tubular member being immersed in said cooling medium with said tubular member extending through said coolant container means, said stator winding means including a plurality of juxtaposed coil sections each of said coil sections including at least a radial passageway extending out of the coil section from the innermost portion thereof and filled with said cooling medium, said stator winding means in its electrically excited state generating heat to cause said cooling medium to boil and form vapor, and condenser means disposed above said coolant container means, and in fluid communication with said coolant container means for directing said vapor rising spontaneously from said coolant medium into and through said condenser means to be liquidized and for directing the liquidized medium to fall into said coolant container means by its own weight.

2. An apparatus as claimed in claim 1 wherein said coil sections comprise a plurality of coils and a plurality of spacer members each having on opposite sides a plurality of recesses extending from the central portion to the periphery thereof, there being a spacer member between each pair of adjacent coils for separting said coils, said recesses being the passageways.

3. An apparatus as claimed in claim 1 wherein each of said coil sections has a portion thereof spaced from said tubular member to permit said cooling medium to contact the innermost portion thereof.

4. An apparatus as claimed in claim 1 wherein each of said coil sections includes a plurality of flat coils disposed radially of the tubular member with the coils spaced along said tubular member at predetermined samll intervals.

5. An apparatus as claimed in claim 1 wherein each of said coil sections comprises a multiple layer winding having a central radial gap extending through all the layers and an axially extending annular gap between each two layers of windings, said axially extending gaps opening into said radial gap.

6. An apparatus as claimed in claim 1 in which said condenser means comprises a condenser chamber opening upwardly from the upper portion of said coolant container means, a condensing medium coil extending through said condenser chamber, a plurality of baffle plates projecting into said condenser chamber from opposite walls thereof and at intervals from each other and alternately overlapping each other and through which said coil extends, said baffle plates defining a sinuous path for the vapor for passing the vapor over the coil, and collection means for collecting condensed cooling medium and directing it back into the body of cooling medium.

7. An apparatus as claimed in claim 6 in which said coil extends from the top of said condensing chamber downwardly toward the coolant container means and said baffle plates projecting into said condensing chamber from the sides thereof and being inclined downwardly in the direction in which they project toward the center of the condensing chamber, alternate baffle plates being inclined downwardly in one direction transversely of the direction in which they project and the remainder of the baffle plates being inclined downwardly in the other direction transversely of the direction in which they project, and said collection means comprising troughs on the inner ends of said baffle plates.

8. An apparatus as claimed in claim 6 in which said coil extends into said condensing chamber laterally thereof, and said baffle plates projecting into said condensing chamber from the top and bottom thereof, said collection means comprising a bottom plate below said baffle plates having an aperture therein directed downward toward said coolant container means.

9. An apparatus as claimed in claim 1 in which said stator winding means has a structural component positioned in said cooling medium in a position for normally blocking the vapor generated in said cooling medium from reaching the free surface of the body of liquid cooling medium, said structural component having passageway means therein for permitting flow of the vapor so as to prevent accumulation of a body of vapor covering the heat dissipating surface of the stator winding means.

* * * * *